United States Patent
Deallenbach et al.

(10) Patent No.: US 10,502,073 B2
(45) Date of Patent: Dec. 10, 2019

(54) BLADES AND DAMPER SLEEVES FOR A ROTOR ASSEMBLY

(71) Applicant: General Electric Company, Schenectady, NY (US)

(72) Inventors: Robert Edward Deallenbach, Flat Rock, NC (US); John James Ligos, Schenectady, NY (US); Kristopher John Frutschy, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 327 days.

(21) Appl. No.: 15/454,388

(22) Filed: Mar. 9, 2017

(65) Prior Publication Data
US 2018/0258775 A1 Sep. 13, 2018

(51) Int. Cl.
*F01D 5/22* (2006.01)

(52) U.S. Cl.
CPC .............. *F01D 5/22* (2013.01); *F01D 5/225* (2013.01); *F05D 2220/30* (2013.01); *F05D 2240/24* (2013.01); *F05D 2240/305* (2013.01); *F05D 2240/306* (2013.01); *F05D 2260/96* (2013.01); *Y02T 50/671* (2013.01); *Y02T 50/673* (2013.01)

(58) Field of Classification Search
CPC . F01D 5/141; F01D 5/147; F01D 5/22; F01D 5/225; F01D 5/24; F05D 2220/30; F05D 2240/24; F05D 2240/305; F05D 2240/306; F05D 2260/96
See application file for complete search history.

(56) References Cited

U.S. PATENT DOCUMENTS

| 3,719,432 | A | | 3/1973 | Musick et al. | |
|---|---|---|---|---|---|
| 4,386,887 | A | | 6/1983 | Ortolano | |
| 4,643,645 | A | | 2/1987 | Robbins et al. | |
| 4,815,938 | A | | 3/1989 | Brown | |
| 5,267,834 | A | * | 12/1993 | Dinh | F01D 5/141 416/191 |
| 5,562,419 | A | * | 10/1996 | Crall | F01D 5/225 416/190 |
| 6,375,420 | B1 | * | 4/2002 | Tanuma | F01D 5/141 415/199.5 |
| 8,328,519 | B2 | * | 12/2012 | Denis | F01D 5/027 29/889 |

(Continued)

OTHER PUBLICATIONS

PCT International Search Report for related application PCT/US2018/016657 dated May 17, 2018; 2 pp.

*Primary Examiner* — Carlos A Rivera
*Assistant Examiner* — Alexander A White
(74) *Attorney, Agent, or Firm* — Armstrong Teasdale LLP

(57) ABSTRACT

A rotor assembly is provided. The rotor assembly includes a plurality of blades spaced circumferentially. An airfoil of each blade includes a pressure side, a suction side, a pressure side nub extending from the pressure side, and a suction side nub extending from the suction side. An airfoil length is greater than one of (i) 40 inches, wherein the rotor is configured for operation at about 3600 rpm, and (ii) 48 inches, wherein the rotor is configured for operation at about 3000 rpm. The rotor assembly also includes a plurality of sleeves. Each of the sleeves extends from a first end to a second end. The first end is coupled to the pressure side nub of a first of the blades and the second end is coupled to the suction side nub of an adjacent second of the blades.

20 Claims, 9 Drawing Sheets

(56) References Cited

U.S. PATENT DOCUMENTS

| | | | |
|---|---|---|---|
| 2008/0175712 A1* | 7/2008 | Asai | F01D 5/16 416/179 |
| 2010/0092295 A1 | 4/2010 | Riaz et al. | |
| 2015/0369046 A1 | 12/2015 | Roberg | |
| 2017/0058681 A1* | 3/2017 | Martin, Jr. | F01D 5/22 |

* cited by examiner

BLADES AND DAMPER SLEEVES FOR A ROTOR ASSEMBLY

BACKGROUND

The field of the disclosure relates generally to rotary machines, and more particularly, to blades and damper sleeves for a rotor assembly.

At least some known rotary machines include at least one rotor assembly coupled to a rotor shaft. The rotor assembly includes a plurality of circumferentially-spaced blades that extend radially outward to define a stage of the rotary machine. For example, but not by way of limitation, the rotor assembly is part of a steam turbine, or part of a compressor or turbine section of a gas turbine engine. Each blade includes an airfoil that extends radially outward towards a casing of the rotary machine.

At least some known blade airfoils, such as but not limited to latter stage blade airfoils, are 40 inches or greater in length. At high rotational speeds, such as but not limited to 3000 rpm for airfoils greater than 48 inches in length or 3600 rpm for airfoils greater than 40 inches in length, at least some such blades are particularly susceptible to non-synchronous vibration that can be associated with flutter, rotating stall, or buffeting during operation of the rotary machine. An operational life cycle of at least some such blades is limited at least in part by fatigue resulting from non-synchronous vibratory stresses during rotary machine operation.

Vibration in at least some known blades of such size has been addressed through use of a rigid coupling between each blade and an adjacent blade, such as coupling the blades of a stage together through mid-span shrouds (or wings). For example, FIG. 1 is a perspective view of a prior art blade 18 with an airfoil having solid wing-style mid-span connectors 20. Mid-span connectors 20 are configured to couple directly against mid-span connectors 20 of adjacent blades to reduce vibrations during operation. However, such methods have been directed to improving blade coupling rather than to improving mechanical damping, and in at least some cases are inadequate to mitigate non-synchronous vibrations in blades having longer airfoils.

BRIEF DESCRIPTION

In one aspect, a rotor assembly coupled to a rotor is provided. The rotor assembly includes a plurality of blades spaced circumferentially. Each of the blades includes an airfoil that extends radially between a root end and a tip end. The airfoil includes a pressure side, a suction side, a pressure side nub extending from the pressure side, and a suction side nub extending from the suction side. An airfoil length defined between the root and tip ends is greater than one of (i) 40 inches, wherein the rotor is configured for operation at about 3600 rpm, and (ii) 48 inches, wherein the rotor is configured for operation at about 3000 rpm. The rotor assembly also includes a plurality of sleeves. Each of the sleeves extends from a first end to a second end. The first end is coupled to the pressure side nub of a first of the blades and the second end is coupled to the suction side nub of an adjacent second of the blades.

In another aspect, a rotor assembly is provided. The rotor assembly includes a plurality of blades spaced circumferentially. Each of the blades includes an airfoil that extends radially between a root end and a tip end. The airfoil includes a pressure side, a suction side, a pressure side nub extending from the pressure side, and a suction side nub extending from the suction side. Each of the blades also includes a cover coupled to the tip end. The cover extends circumferentially from a suction side edge to a pressure side edge, and the suction side edge of the cover of each of the blades is configured to couple against the pressure side edge of the cover of an adjacent one of the blades. The rotor assembly also includes a plurality of sleeves. Each of the sleeves extends from a first end to a second end. The first end is coupled to the pressure side nub of a first of the blades and the second end is coupled to the suction side nub of an adjacent second of the blades.

DETAILED DESCRIPTION

Figure 1:
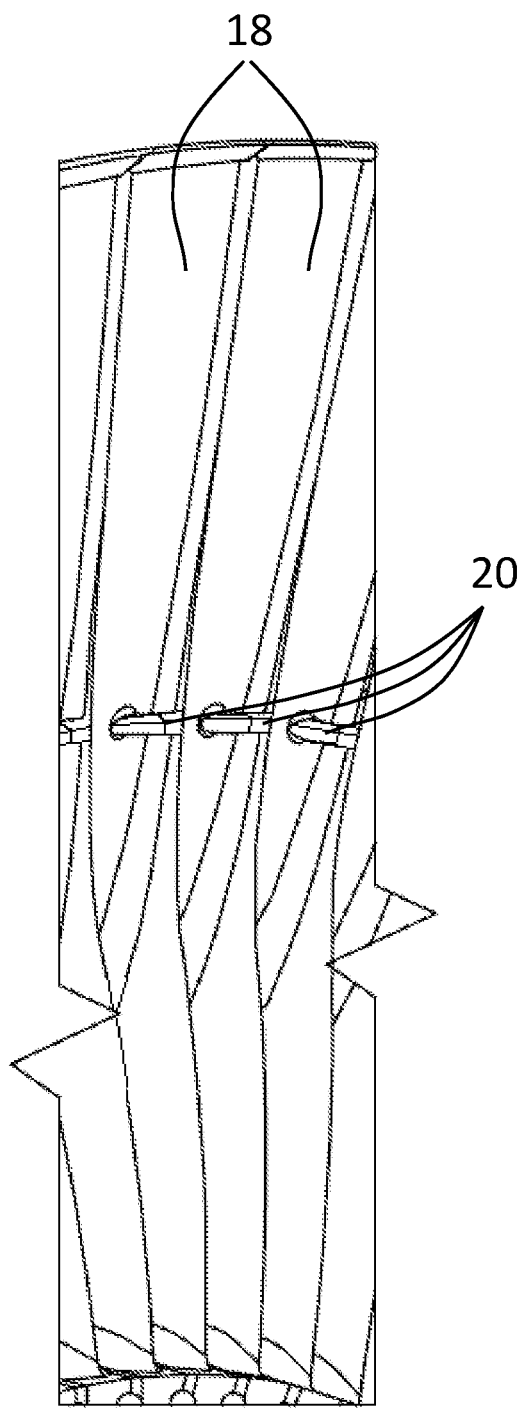
FIG. 1 is a perspective view of a prior art blade with wing couplers that may be used with a rotary machine.

The embodiments described herein include a rotor assembly that includes a plurality of blades and a plurality of damping sleeves non-rigidly coupled between mid-span nubs of the blades. In some embodiments, the rotor assembly is one of (i) coupled to a rotor configured for operation at about 3600 rpm, and an airfoil length of the blades is greater than 40 inches, and (ii) coupled to a rotor configured for operation at about 3000 rpm, and the airfoil length of the blades is greater than 48 inches, and the sleeves are selected to facilitate damping of non-synchronous vibrations in the blades. For example, in some such embodiments, a mass ratio and/or a density ratio of the sleeves and airfoils is selected to facilitate damping of non-synchronous vibrations in the blades. Additionally or alternatively, the blades include integral covers (i.e. tip shrouds) configured to couple against the covers of adjacent blades, and the covers are configured to further facilitate damping of non-synchronous vibrations in cooperation with the sleeves. Additionally or alternatively, the ends of the sleeve are configured to cooperate with the nubs to retain the sleeve as the blade untwists from a pre-twisted at-rest state to an operating state, and to orient the sleeve during operation, reducing an aerodynamic loss associated with the presence of the sleeve in a path of the working fluid. In certain embodiments, sleeves having different weights are used in a row of blades to facilitate damping over a wider range of vibrational frequencies and/or amplitudes, and/or to balance the row of blades.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a rotary machine, and the term "downstream" refers to a downstream or exhaust end of the rotary machine.

Figure 2:
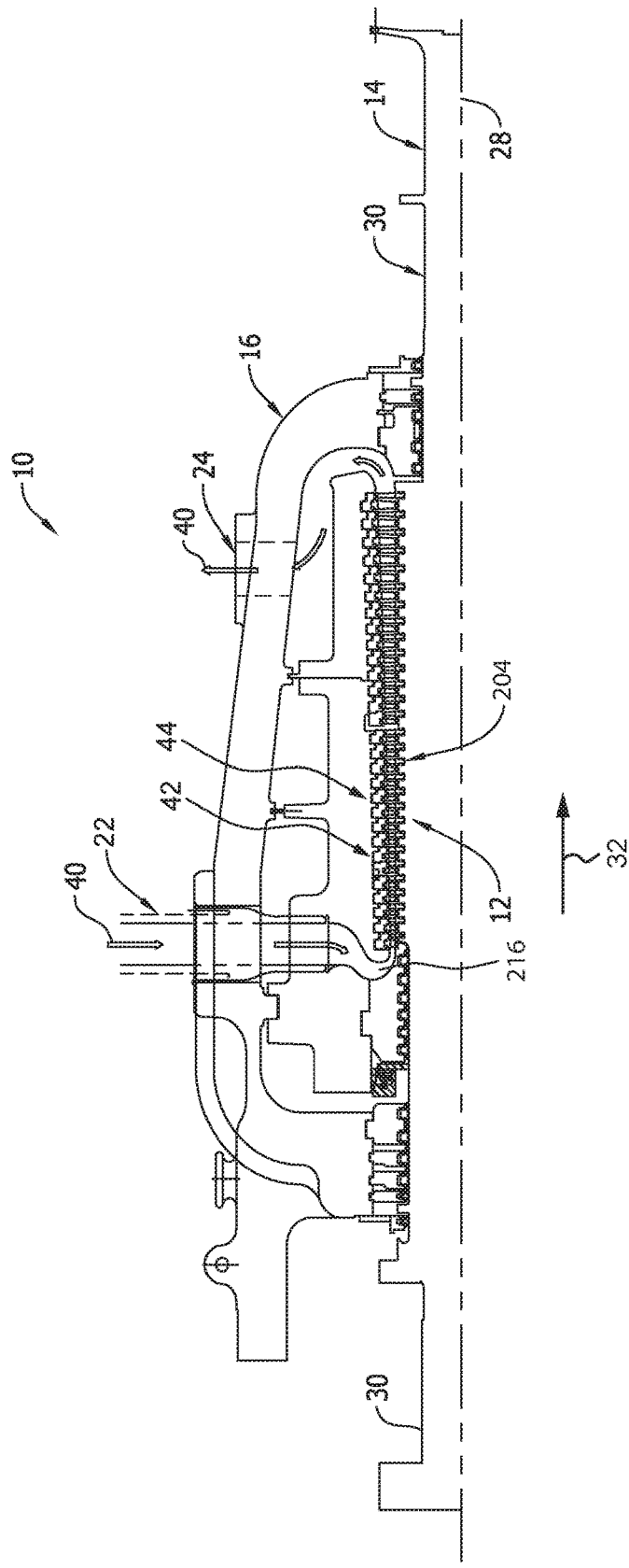
FIG. 2 is a schematic view of an exemplary rotary machine.

FIG. 2 is a schematic view of an exemplary rotary machine 10. In the exemplary embodiment, rotary machine 10 is a single-flow steam turbine. In alternative embodiments, rotary machine 10 is an opposed-flow steam turbine. Moreover, the present embodiments are not limited to only being used in steam turbines, but rather can be used in other rotary machine systems, such as gas turbines. Alternatively, rotary machine 10 is any other turbine engine and/or rotary machine, including, without limitation, a gas turbofan aircraft engine, other aircraft engine, a wind turbine, a compressor, and/or a pump.

In the exemplary embodiment, rotary machine 10 includes a plurality of stages 12. Each stage 12 includes a plurality of rotor blades 204 coupled to a shaft 14. It should be noted that, as used herein, the term "couple" is not limited to a direct mechanical, electrical, and/or communication connection between components, but may also include an indirect mechanical, electrical, and/or communication connection between multiple components. Rotor blades 204 of each stage 12 are disposed circumferentially around, and extend radially outward from, shaft 14. Each stage 12 includes any suitable number of rotor blades 204 that enables rotary machine 10 to operate as described herein. Shaft 14 is supported at opposing end portions 30 of shaft 14 by bearings (not shown).

A casing 16 surrounds plurality of stages 12. In the exemplary embodiment, a plurality of diaphragms 42 is coupled to casing 16, such that a respective diaphragm 42 is positioned upstream of each stage 12. Each diaphragm 42 includes a row of partitions 44. Partitions 44 are generally airfoil shaped and are disposed circumferentially around, and extend radially inward from, casing 16. Alternatively, any stationary vane or nozzle assembly, or no stationary vane or nozzle assembly, is disposed upstream of each stage 12.

Rotary machine 10 includes a high pressure steam inlet 22 and a low pressure steam exhaust 24. Shaft 14 is rotatable about a centerline axis 28. During operation, high-pressure and high-temperature steam 40 is channeled from a steam source, such as a boiler or the like (not shown), through HP steam inlet 22 into a working fluid path 216, in a downstream direction 32 through casing 16, where it encounters blades 204. As the steam impacts blades 204, it induces rotation of shaft 14 about centerline axis 28. Thus, thermal energy of steam 40 is converted to mechanical rotational energy by stages 12. Mechanical rotational energy of shaft 14 may be used to drive a load such as, but not limited to, an electrical generator and/or a mechanical drive application. Steam 40 exits casing 16 at low pressure steam exhaust 24. Steam 40 is then channeled to the boiler (not shown), where it is reheated, and/or to other components of the system, for example, a low pressure turbine section or a condenser (not shown). Alternatively, blades 204 are included in a turbine section or compressor section of a gas turbine (not shown), or in any suitable rotary machine, as discussed above. For example, but not by way of limitation, the working fluid delivered to the turbine section may be combustion gases.

Figure 3:
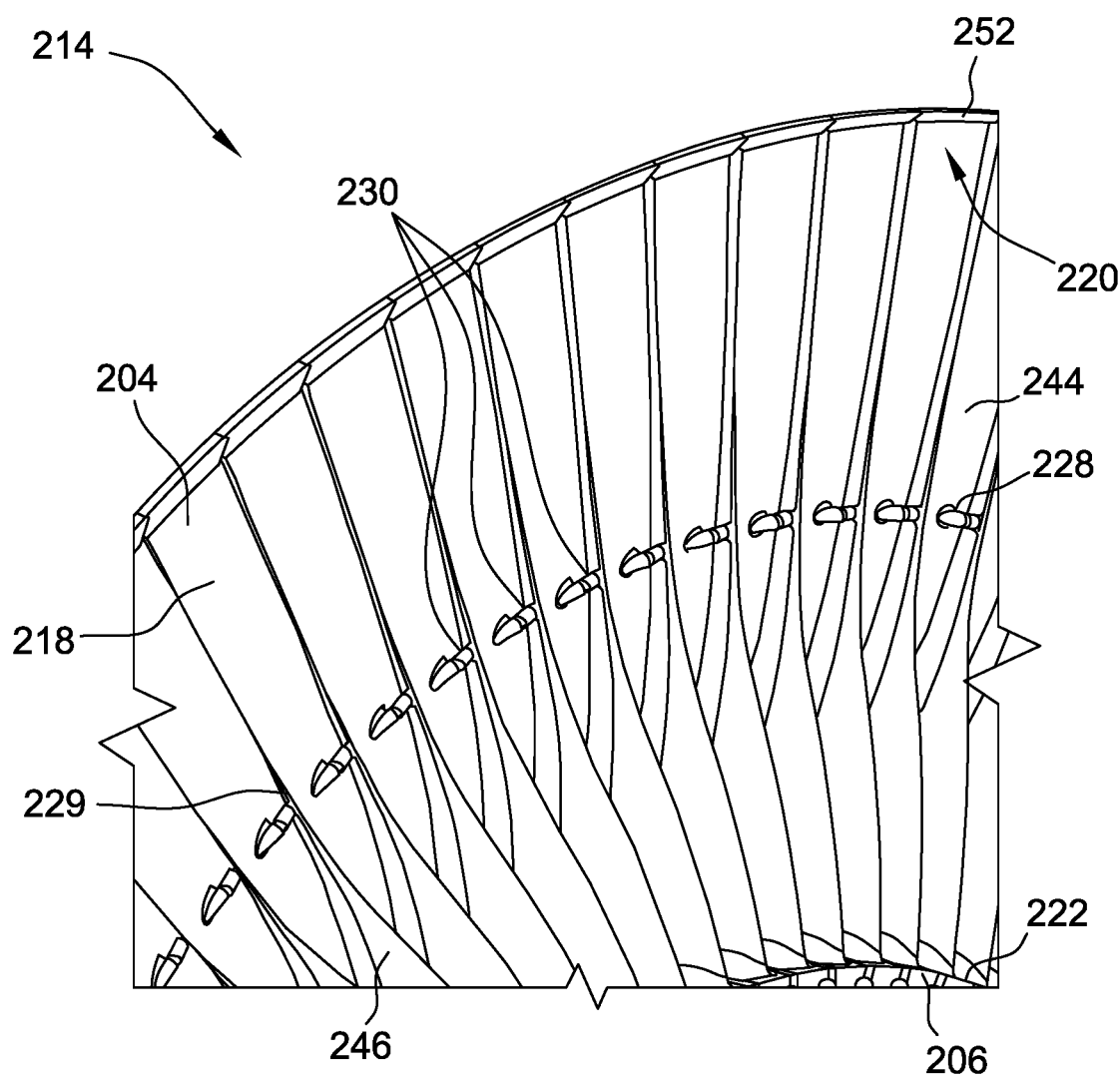
FIG. 3 is a perspective view of an upstream side of an exemplary rotor assembly that may be used with the rotary machine shown in FIG. 2.
Figure 4:
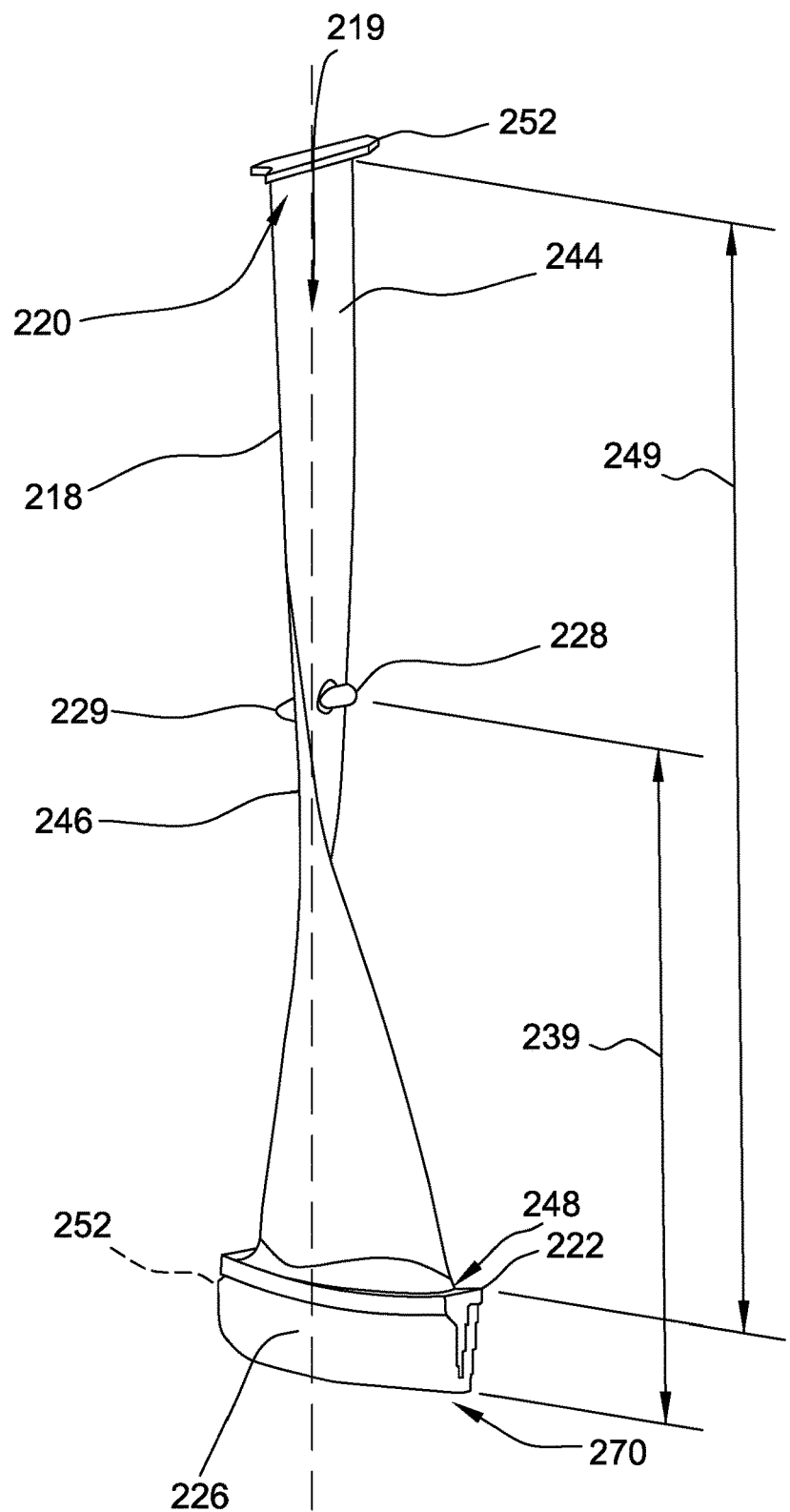
FIG. 4 is a first perspective view of an exemplary embodiment of a blade that may be used in the rotor assembly shown in FIG. 3.

FIG. 3 is a perspective view of an upstream side of an exemplary rotor assembly 214 that may be used with rotary machine 10. FIG. 4 is a first perspective view of an exemplary embodiment of blade 204. With reference to FIGS. 2 and 3, in the exemplary embodiment, rotor assembly 214 includes a plurality of blades 204 and is configured for use as one of stages 12 of rotary machine 10 (shown in FIG. 1). Each blade 204 includes an airfoil 218 that extends radially between a root end 248 and a tip end 220, defining a length 249 therebetween. Blade 204 also extends axially between a leading edge 264 and a trailing edge 266. More specifically, each airfoil 218 defines a pressure side 244 and an opposite suction side 246 that each extend between leading edge 264 and trailing edge 266, and between root end 248 and tip end 220. Pressure side 244 is generally concave, and suction side 246 is generally convex.

Further in the exemplary embodiment, each blade 204 includes an integral cover 252 coupled to, and extending radially outward from, tip end 220 of airfoil 218. In the exemplary embodiment, cover 252 is configured such that during operation of rotary machine 10, cover 252 interfaces with covers 252 of adjacent blades 204 to substantially restrict working fluid in path 216 from leaking radially outward of covers 252. Additionally, in some embodiments, the interfacing covers 252 provide additional mechanical support and vibration damping to rotor assembly 214, as will be described herein. In alternative embodiments, blade 204 includes any suitable cover or other tip feature, or no tip feature.

In the exemplary embodiment, each blade 204 also includes a platform 222 coupled to root end 248. Platform 222 at least partially defines a radially inner boundary of working fluid path 216. In the exemplary embodiment, each blade 204 further includes a dovetail region 226 that extends radially inward from platform 222 to a base portion 270. Dovetail region 226 is shaped to facilitate secure coupling of blade 204 to a rotor disk 206 coupled to shaft 14. More specifically, in the exemplary embodiment, dovetail 226 is characterized by a wavy outer surface shaped to slide generally axially into a complementarily shaped slot (not shown) defined in a rotor disk for the corresponding stage 12 (shown in FIG. 1). In alternative embodiments, dovetail 226 has any other suitable shape that enables blade 204 to function as described herein.

A pressure side nub 228 extends from pressure side 244 of airfoil 218, and a suction side nub 229 extends from suction side 246 of airfoil 218, at an intermediate location between root end 248 and tip end 220 defined at a distance 239 from root end 248. For each pair of blades 204 in rotor assembly 214, a sleeve 230 interfaces with and extends between pressure side nub 228 of a first blade 204 and suction side nub 229 of an adjacent second blade 204, as will be described herein. Nubs 228 and 229 are configured to accommodate static and vibration loads transmitted to blade 204 through a non-rigid, frictional coupling to sleeves 230. In alternative embodiments, each blade 204 includes any suitable structure that enables blade 204 to function as described herein.

Figure 5:
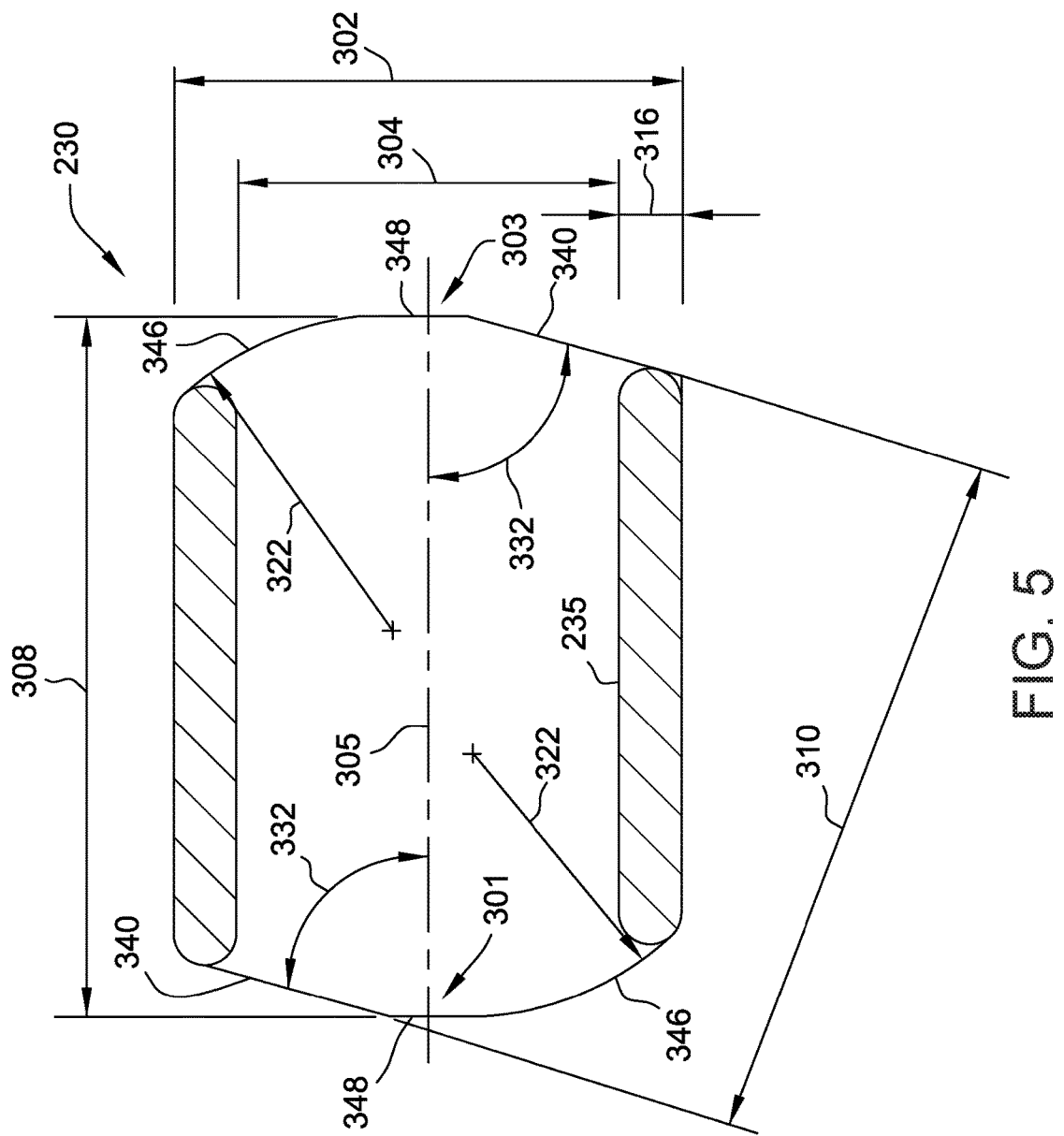
FIG. 5 is a cross-sectional side view of an exemplary sleeve that may be used with the rotor assembly shown in FIG. 4.
Figure 6:
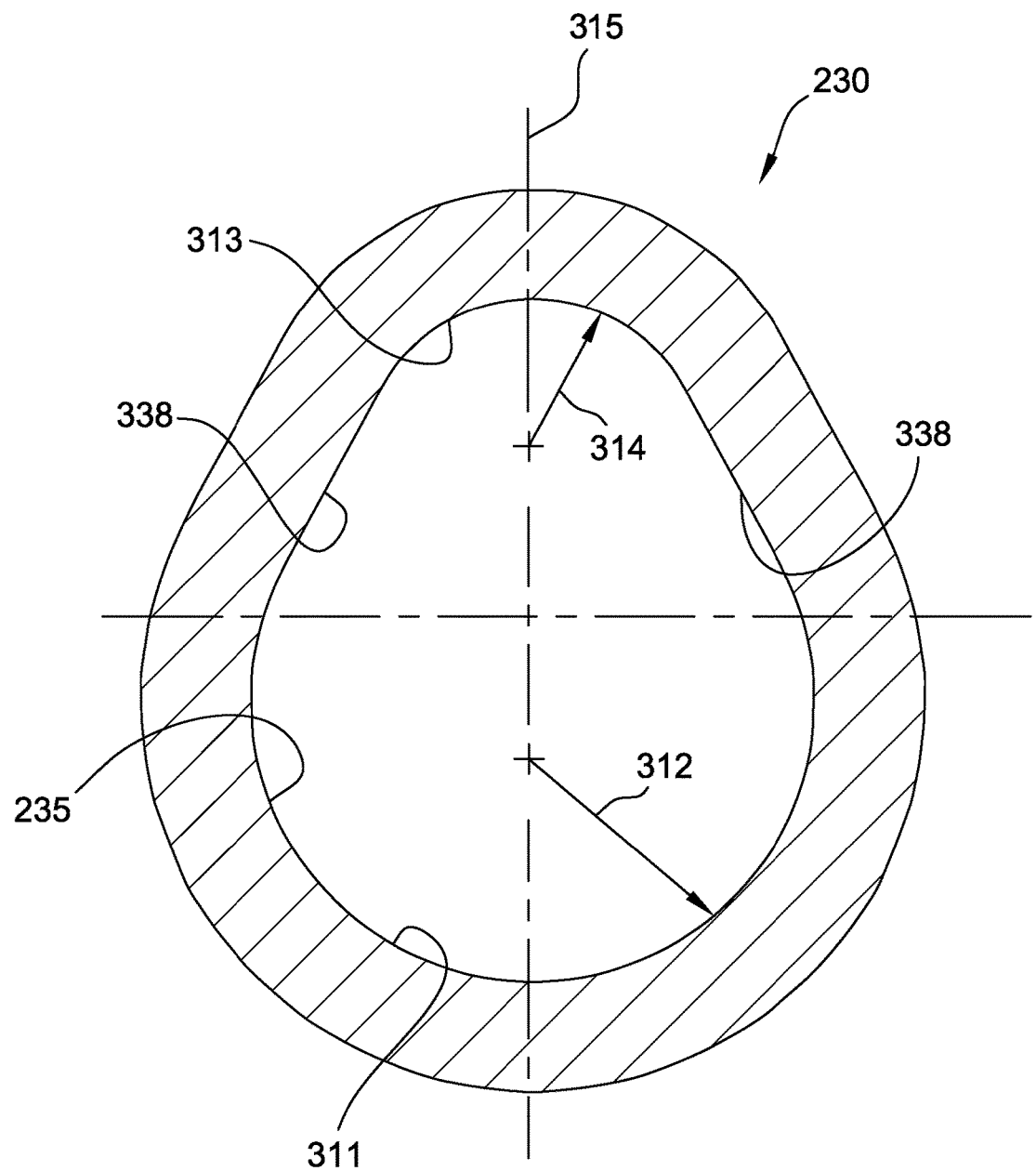
FIG. 6 is a cross-sectional end view of the sleeve shown in FIG. 5.

FIG. 5 is a cross-sectional side view of an exemplary embodiment of sleeve 230. FIG. 6 is a cross-sectional end view of sleeve 230. In the exemplary embodiment, sleeve 230 extends along a longitudinal axis 305 from a first end 301 to a second end 303, and defines a length 308 therebetween. In the exemplary embodiment, first end 301 is configured to couple to pressure side nub 228 of blade 204, and second end 303 is configured to couple to suction side nub 229 of blade 204 (shown in FIG. 4).

Sleeve 230 includes an outer width 302, an inner width 304 defined by an inner perimeter 235, and a wall thickness 316 defined therebetween. In the exemplary embodiment, a cross-section of inner perimeter 235 is symmetric about a transverse axis 315. Also in the exemplary embodiment, the cross-section of inner perimeter 235 includes a major arcuate portion 311 having a major radius 312, a minor arcuate portion 313 having a minor radius 314 that is less than major radius 312, and a pair of intermediate portions 338 each extending from a respective end of major arcuate portion 311 to a respective end of minor arcuate portion 313. In the exemplary embodiments, intermediate portions 338 are each generally linear. Alternatively, each intermediate portion 338 has any suitable shape that enables sleeve 230 to function as described herein. Each of major arcuate portion 311, minor arcuate portion 313, and intermediate portions 338 extends longitudinally between first end 301 and second end 303. In alternative embodiments, inner perimeter 235 has any suitable cross-section that enables sleeve 230 to function as described herein.

In the exemplary embodiment, each of first end 301 and second end 303 of sleeve 230 includes a flat end portion 340 and a curved end portion 346. More specifically, flat end portion 340 of first end 301 and flat end portion 340 of second end 303 are diagonally opposed, and a diagonal length 310 is defined therebetween. Similarly, curved end portion 346 of first end 301 and curved end portion 346 of second end 303 are diagonally opposed. Also in the exemplary embodiment, each flat end portion 340 is oriented at an angle 332 relative to longitudinal axis 305, and each curved end portion 346 defines a radius 322. Each of first end 301 and second end 303 further includes an intermediate end portion 348 extending between flat end portion 340 and curved end portion 346. In alternative embodiments, each of first end 301 and second end 303 has any suitable structure that enables sleeve 230 to function as described herein.

Figure 7:
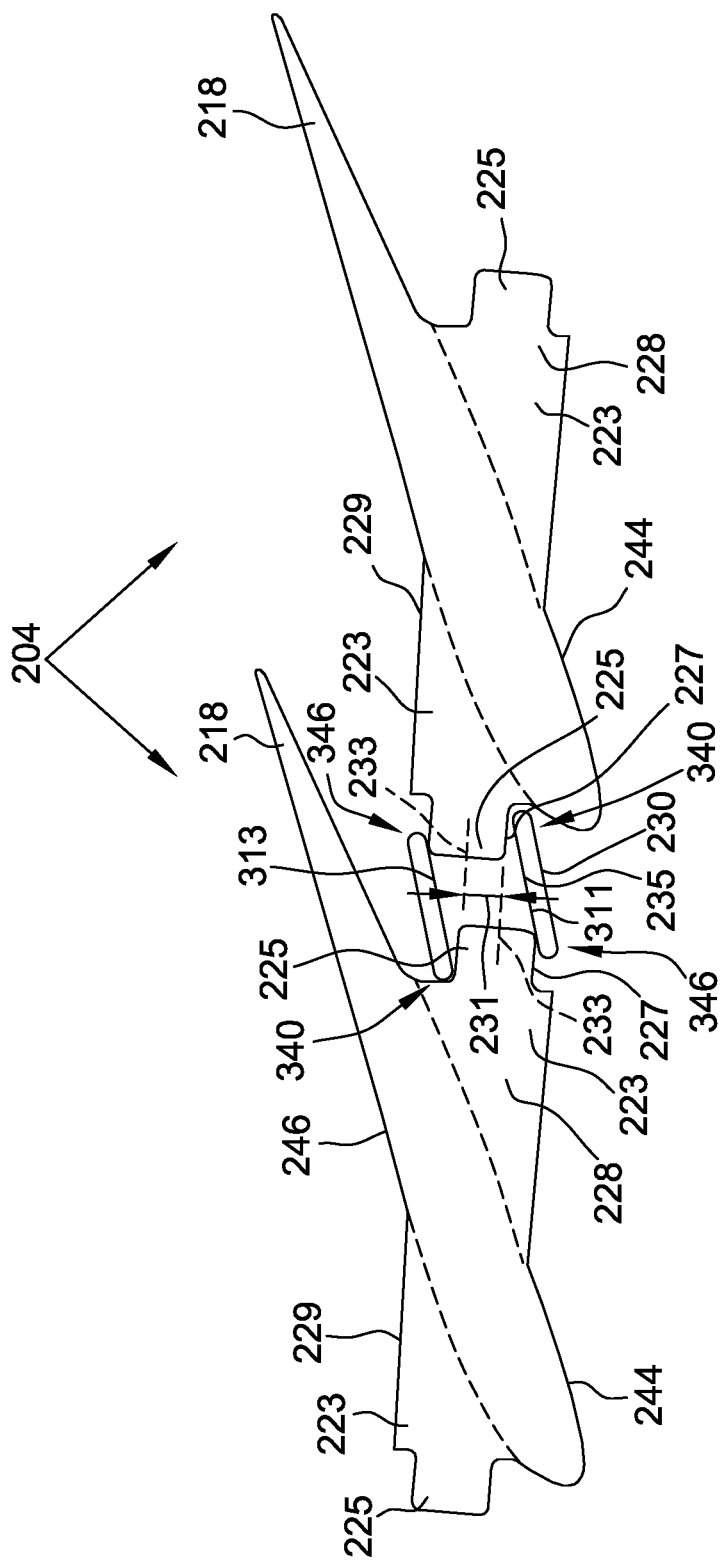
FIG. 7 is a cross-sectional view of the sleeve shown in FIG. 5 coupled between a pair of the blades shown in FIG. 4.

FIG. 7 is a cross-sectional view of sleeve 230 coupled between a pair of blades 204. More specifically, the cross-section shown in FIG. 7 is taken at approximately distance 239 along blade radial axis 219 (shown in FIG. 4). Blades 204 and sleeve 230 are illustrated in FIG. 7 in a non-operating condition of rotary machine 10 (shown in FIG. 1), that is, a pre-twist of airfoils 218 is not being untwisted due to operational forces.

In the exemplary embodiment, sleeve 230 is configured to cooperate with pressure side nub 228 and suction side nub 229 to facilitate improved structural support and performance of rotor assembly 214. In particular, sleeve 230 is configured to facilitate mechanical damping of non-synchronous vibrations of airfoils 218 of blades 204. For example, in certain embodiments, a ratio of a mass of sleeves 230 to a mass of airfoils 218 is in a range from about 0.01 percent to about 1.0 percent. As compared to known systems for coupling blades 204 in rotor assembly 214, the ratio of sleeve to airfoil mass in the above-described range provides advantages in facilitating mechanical damping of non-synchronous vibrations of airfoils 218, such as, but not limited to, when rotor assembly 214 is configured for rotation at about 3600 rpm and airfoils 218 have length 249 greater than 40 inches, or rotor assembly 214 is configured for rotation at about 3000 rpm and airfoils 218 have length 249 greater than 48 inches. In particular, in some embodiments, the ratio of the mass of sleeves 230 to the mass of airfoils 218 in a range from about 0.18 percent to about 0.28 percent provides particular advantages in facilitating mechanical damping of non-synchronous vibrations of airfoils 218, such as, but not limited to, when rotor assembly 214 is configured for rotation at about 3600 rpm and airfoils 218 have length 249 greater than 40 inches, or rotor assembly 214 is configured for rotation at about 3000 rpm and airfoils 218 have length 249 greater than 48 inches. In alternative embodiments, the ratio of the mass of sleeves 230 to the mass of airfoils 218 is any suitable value that enables rotor assembly 214 to function as described herein.

For another example, in certain embodiments, a ratio of a density of a first material used to form sleeves 230 to a density of a second material used to form airfoils 218 is in a range from about 0.5 to about 2.0. As compared to known systems for coupling blades 204 in rotor assembly 214, the ratios of sleeve to airfoil material density in the above-described range provides advantages in facilitating mechanical damping of non-synchronous vibrations of airfoils 218, such as, but not limited to, when rotor assembly 214 is configured for rotation at about 3600 rpm and airfoils 218 have length 249 greater than 40 inches, or rotor assembly 214 is configured for rotation at about 3000 rpm and airfoils 218 have length 249 greater than 48 inches. In particular, in some embodiments, the sleeve material to airfoil material density ratio in a range from about 1.5 to about 1.9 provides particular advantages in facilitating mechanical damping of non-synchronous vibrations of airfoils 218, such as, but not limited to, when rotor assembly 214 is configured for rotation at about 3600 rpm and airfoils 218 have length 249 greater than 40 inches, or rotor assembly 214 is configured for rotation at about 3000 rpm and airfoils 218 have length 249 greater than 48 inches. For example, but not by way of limitation, sleeve 230 is formed from steel and airfoil 218 is formed from titanium. In alternative embodiments, each of sleeve 230 and airfoil 218 is formed from any material having any suitable density that enables rotor assembly 214 to function as described herein.

For another example, in certain embodiments, a ratio of distance 239 of nubs 228 and 229 from root end 248 to length 249 of airfoil 218 is in a range from about 50 percent to about 75 percent. In some such embodiments, the ratio of nub distance to airfoil length in the above-described range provides advantages in facilitating mechanical damping of non-synchronous vibrations of airfoils 218, such as, but not limited to, when rotor assembly 214 is configured for rotation at about 3600 rpm and airfoils 218 have length 249 greater than 40 inches, or rotor assembly 214 is configured for rotation at about 3000 rpm and airfoils 218 have length 249 greater than 48 inches. In alternative embodiments, the ratio of distance 239 to length 249 is any suitable value that enables rotor assembly 214 to function as described herein.

Figure 8:
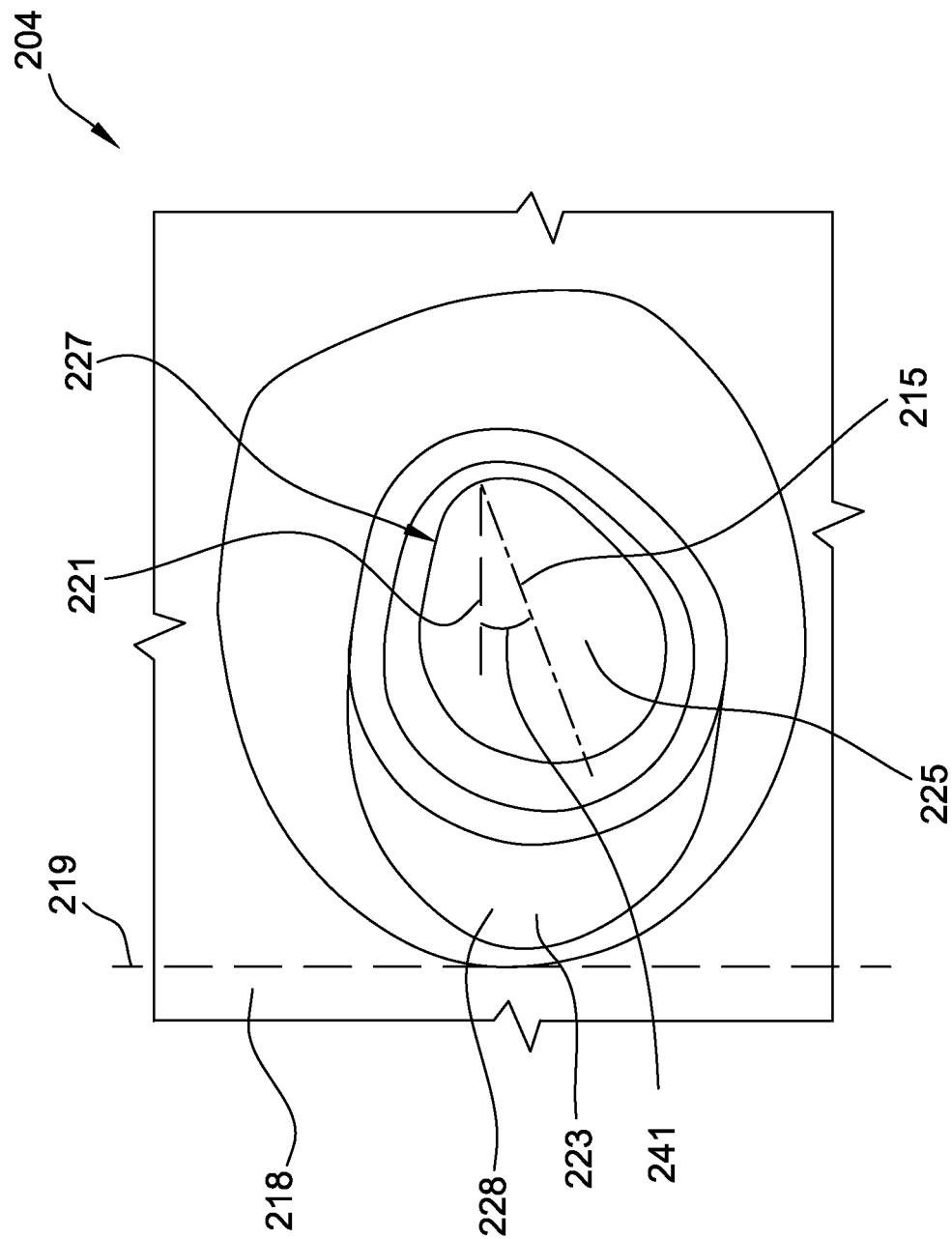
FIG. 8 is a perspective view an exemplary pressure side nub that may be used with the blade shown in FIG. 4.

FIG. 8 is an end view of an exemplary pressure side nub 228. With reference to FIGS. 3-8, each of nubs 228 and 229 includes a base portion 223 coupled to airfoil 218, and a distal end 225 extending circumferentially from base portion 223. Each distal end 225 is sized to be received within inner perimeter 235 of sleeve 230, such that sleeve 230 is slidably coupleable over respective distal ends 225 of nubs 228 and 229 of adjacent blades 204 during assembly of rotor assembly 214. More specifically, inner perimeter 235 of sleeve 230 is slidable over respective outer perimeters 227 of distal ends 225 of pressure side nub 228 and suction side nub 229 of adjacent blades 204 during assembly of rotor assembly 214. In alternative embodiments, each of nubs 228 and 229 includes any suitable structure that enables sleeve 230 to function as described herein.

Further in the exemplary embodiment, respective distal ends 225 of pressure side nub 228 of one blade 204 and suction side nub 229 of an adjacent blade 204 are shaped such that, when sleeve 230 is coupled to nubs 228 and 229 and rotary machine 10 (shown in FIG. 1) is not in operation, respective axes 233 of nubs 228 and 229 are offset, i.e. out of alignment, by a distance 231, and longitudinal axis 305 of sleeve 230 is non-parallel, i.e. out of alignment, with both nub axes 233. When rotary machine 10 is in operation, respective axes 233 of nubs 228 and 229 align with each other (not shown), and longitudinal axis 305 of sleeve 230 aligns with nub axes 233, due to untwisting of blades 204 under operational loads. Moreover, sleeve 230 engages nubs 228 and 229 sufficiently loosely to enable rotation of sleeve 230, with respect to nubs 228 and 229, into alignment as blades 204 untwist due to operation of rotary machine 100. In addition, inner perimeter 235 is sized such that sleeve 230 maintains engagement with nubs 228 and 229 during operation of rotary machine 10 after axes 233 are in alignment.

In certain embodiments, length 249 of airfoil 218 is equal to or greater than 40 inches, and sleeves 230 are retained by, and cooperate with, nubs 228 and 229 to facilitate damping of non-synchronous vibrations in blades 204 of rotor assembly 214 during operation of rotary machine 10. For example, in the exemplary embodiment, each sleeve 230 is configured to couple to respective nubs 228 and 229 such that, when rotary machine 10 is not in operation, diagonally opposed curved end portions 346 are coupled against distal portions of respective distal ends 225, and diagonally opposed flat end portions 340 are coupled proximate to respective base portions 223 of nubs 228 and 229. In certain embodiments, curved end portions 346 coupled against the distal portions of respective distal ends 225 facilitate rotation of sleeve 230, with respect to nubs 228 and 229, into alignment as blades 204 untwist due to operation of rotary machine 10. Moreover, curved end portions 346 further facilitate retention of sleeve 230 by nubs 228 and 229 during operation of rotary machine 10, while reducing an amount of material included in sleeve 230. In alternative embodiments, sleeve 230 is configured to couple to nubs 228 and 229 in any suitable fashion that enables sleeve 230 to function as described herein.

Additionally in the exemplary embodiment, sleeve 230 and nubs 228 and 229 are configured to orient sleeve 230 such that major arcuate portion 311 faces upstream and minor arcuate portion 313 faces downstream when sleeve 230 is coupled to nubs 228 and 229. For example, outer perimeter 227 of each of nubs 228 and 229 defines a transverse axis 215 configured to align with transverse axis 315 of sleeve 230. An upstream portion of outer perimeter 227 of each of nubs 228 and 229 is complementarily shaped to receive major radius 312, and a downstream portion of outer perimeter 227 of each of nubs 228 and 229 is complementarily shaped to receive minor radius 314, such that sleeve 230 is maintained in the orientation having major arcuate portion 311 facing upstream and minor arcuate portion 313 facing downstream when rotary machine 100 is in operation. Alternatively, inner perimeter 235 is shaped complementarily to nubs 228 and 229 in any suitable fashion to facilitate a correct orientation of sleeve 230 during assembly of rotor assembly 214. In certain embodiments, major arcuate portion 311 facing upstream and minor arcuate portion 313 facing downstream facilitates reduced aerodynamic losses due to flow over sleeves 230 in working fluid path 216 (shown in FIG. 3).

Further in the exemplary embodiment, transverse axis 215 of distal end 225 of pressure side nub 228 is oriented at a nub angle 241 relative to a plane 221 defined perpendicular to blade radial axis 219. Similarly, transverse axis 215 of distal end 225 of suction side nub 229 is oriented at a substantially identical nub angle (not shown), such that transverse axis 315 of sleeve 230 is also aligned at nub angle 241 relative to plane 221 when sleeve 230 is coupled to nubs 228 and 229. In certain embodiments, nubs 228 and 229 and sleeves 230 oriented at nub angle 241 further facilitate reduced aerodynamic losses due to flow over nubs 228 and 229 and sleeves 230 in working fluid path 216 (shown in FIG. 1) during operation of rotary machine 10, as compared to sleeve 230 oriented parallel to circumferential direction 221. For example, in certain embodiments, reduced aerodynamic losses are achieved for nub angle 241 in a range of from about 5 degrees to about 10 degrees. In particular embodiments, reduced aerodynamic losses are achieved for nub angle 241 of about 7 degrees. In alternative embodiments, nub angle 241 is any suitable angle, including zero, that enables rotor assembly 214 to function as described herein.

In alternative embodiments, sleeve 230 and nubs 228 and 229 are configured to orient sleeve 230 in any suitable fashion that enables rotor assembly 214 to function as described herein.

Figure 9:
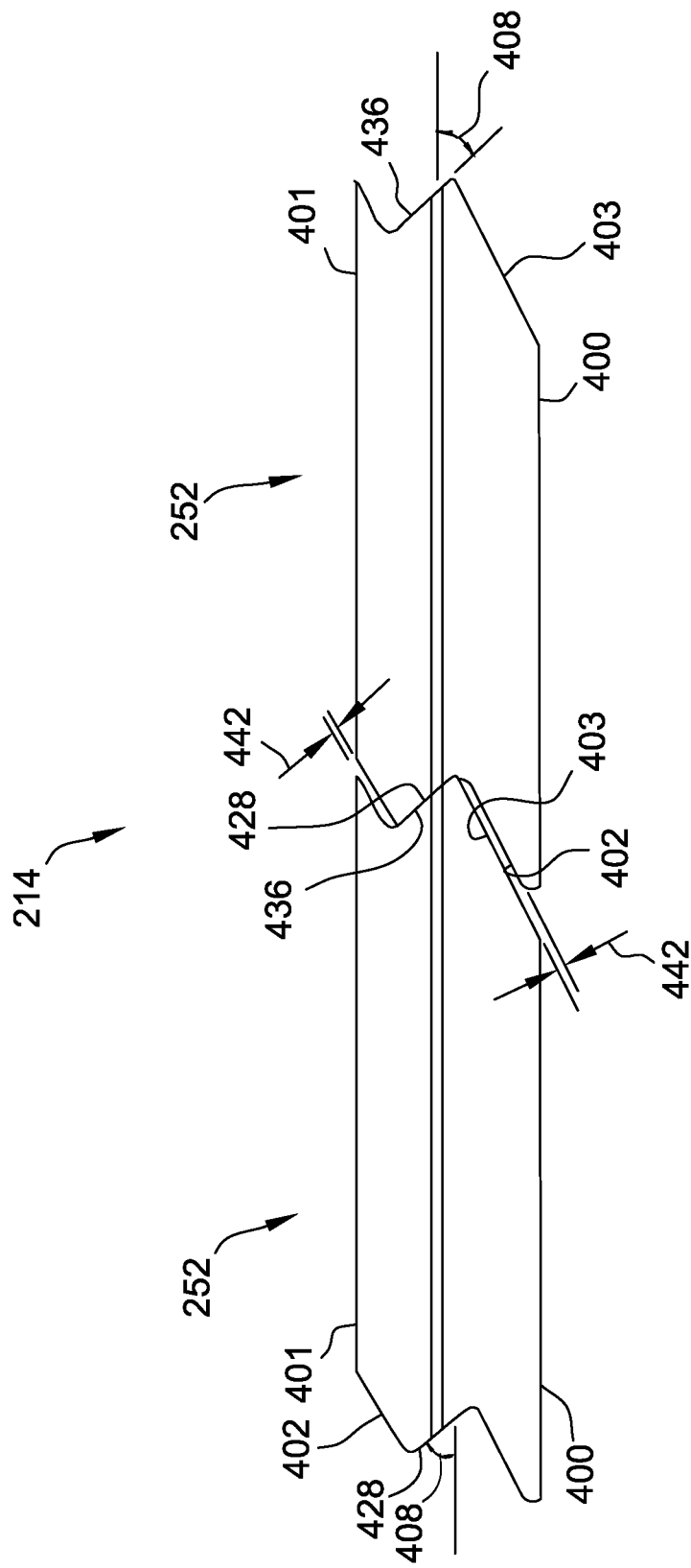
FIG. 9 is a top view of an exemplary cover coupled to each of two adjacent blades in the rotor assembly shown in FIG. 3.

FIG. 9 is a top view of an exemplary cover 252 coupled to each of two adjacent blades 204 in rotor assembly 214 (shown in FIG. 3). In the exemplary embodiment, each cover 252 extends axially from a leading edge 400 to a trailing edge 401, and circumferentially from a suction side edge 402 to a pressure side edge 403. In the exemplary embodiment, during operation of rotary machine 10, suction side edge 402 of cover 252 of each blade 204 in rotor assembly 214 is configured to couple against pressure side edge 403 of cover 252 of an adjacent blade 204.

More specifically, in the exemplary embodiment, suction side edge 402 defines a primary suction side contact surface 428, and pressure side edge 403 defines a primary pressure side contact surface 436. Primary contact surfaces 428 and 436 of adjacent blades 204 are configured to couple against each other when rotary machine 10 is in operation. For example, a gap (not shown) is defined between primary contact surfaces 428 and 436 when rotary machine 10 is not in operation, and the gap is eliminated as rotary machine 10 transitions into operation. In the exemplary embodiment, when rotary machine 10 is not in operation, a clearance gap 442 is defined between portions of suction side edge 402 and the adjacent pressure side edge 403 other than contact surfaces 428 and 436. As rotary machine 10 transitions into operation, contact surfaces 428 and 436 are configured to slide relative to each other such that clearance gap 442 is increased when rotary machine 10 is in operation. Thus, cover 252 accommodates untwisting of blades 204 from a pre-twisted condition as rotary machine 10 transitions into operation. In alternative embodiments, each of suction side edge 402 and pressure side edge 403 has any suitable shape that enables cover 252 to function as described herein.

A contact angle 408 is defined between each contact surface 428 and 436 and a circumferential direction perpendicular to centerline axis 28 of shaft 12 (shown in FIG. 2). A force transmitted between adjacent covers 252 through contact surfaces 428 and 436 includes a compression component normal to contact surfaces 428 and 436 and a friction component parallel to contact surfaces 428 and 436. In certain embodiments, rotor assembly 214 is configured for rotation at about 3600 rpm and airfoils 218 have length 249 greater than 40 inches, or rotor assembly 214 is configured for rotation at about 3000 rpm and airfoils 218 have length 249 greater than 48 inches, and contact angle 408 is selected to cooperate with sleeves 230 (shown in FIG. 3) to further facilitate damping of non-synchronous vibration in blades 204. More specifically, contact angle 408 is selected to facilitate relative sliding motion between contact surfaces 428 and 436 to enable untwisting of blades 204 during transition into operation of rotary machine 10, while cooperating with sleeves 230 to facilitate improving mechanical damping by limiting non-synchronous vibratory responses during operation. For example, but not by way of limitation, cover 252 having selected contact angle 408 facilitates reducing a sensitivity of transient interactions between adjacent covers 252 to a friction coefficient between contact surfaces 428 and 436, as compared to transient interactions between adjacent covers 252 where contact angle 408 is not within the selected range. Reduced sensitivity to the friction coefficient between contact surfaces 428 and 436 reduces wear on each of contact surfaces 428 and 436, facilitates accommodation of transient interactions between adjacent covers 252, facilitates untwisting of adjacent airfoils 218 of adjacent blades 204 during transition into operation of rotary machine 10, and/or facilitates retention of, and cooperation with, sleeves 230 to facilitate mechanical damping of non-synchronous vibrations within blades 204 of rotor assembly 214.

For example, in certain embodiments, contact angle 408 in a range of from about 30 degrees to about 65 degrees provides at least some of the advantages described above. Moreover, in some such embodiments, contact angle 408 in a range of from about 40 degrees to about 55 degrees further provides at least some of the advantages described above. In alternative embodiments, contact angle 408 is any suitable angle that enables rotor assembly 214 to function as described herein.

It should be understood that, although contact surfaces 428 and 436 and contact angle 408 have been described as implemented on covers 252 with generally "z" shaped suction side edge 402 and pressure side edge 403, in alternative embodiments the advantages described above for contact angle 408 are obtained for covers 252 having contact surfaces 428 and 436 implemented on suction side edge 402 and/or pressure side edge 403 having different shapes and/or a different number of clearance surfaces.

With reference again to FIGS. 3, 5, 6, and 7, in some embodiments, airfoils 218 have any suitable length 249, and rotor assembly 214 includes at least one sleeve 230 having a first weight that differs from a second weight of others of sleeves 230 included in rotor assembly 214. For example, sleeves 230 in rotor assembly 214 are formed from a substantially identical material and have substantially identical inner widths 304, and outer width 302 of at least one sleeve 230 is greater than outer width 302 of another of sleeves 230, such that wall thickness 316 of the at least one sleeve 230 is greater than wall thickness 316 of the other of sleeves 230, thereby causing the at least one sleeve 230 to be heavier relative to the other of sleeves 230. In some such embodiments, wall thickness 316 of at least one sleeve is increased by a factor of up to about 1.5 relative to wall thickness 316 of another of sleeves 230. In alternative embodiments, any suitable dimension of at least one sleeve 230 is different relative to another of sleeves 230, such that the at least one sleeve 230 is heavier than the other of sleeves 230.

Additionally or alternatively, sleeves 230 in rotor assembly 214 have substantially identical dimensions, and at least one sleeve 230 is formed at least partially from a heavier material than another of sleeves 230, thereby causing the at least one sleeve 230 to be heavier relative to the other of sleeves 230. In some such embodiments, a density of a material used to form at least one sleeve is increased by a factor of up to about 1.5 relative to a density of a material used to form another of sleeves 230.

In some such embodiments, rotor assembly 214 including the at least one sleeve 230 having a weight that differs from a weight of the others of sleeves 230 facilitates improved mechanical damping of blades 204 of any airfoil length 249 in rotor assembly 214 during operation of rotary machine 10 (shown in FIG. 2), while maintaining an acceptable structural performance of blades 204 and an acceptable operation of rotary machine 10. For example, in some such embodiments, rotor assembly 214 includes a first plurality of sleeves 230 having a first weight and a second plurality of sleeves 230 having a second weight that is less than the first weight. The first weight is selected to facilitate damping of vibratory disturbances to rotor assembly 214 having a frequency and/or amplitude within a first range, and the second weight is selected to facilitate damping of vibratory disturbances to rotor assembly 214 having a frequency and/or amplitude within a second range that differs from the first range. Thus, rotor assembly 214 including the at least one sleeve 230 having a weight that differs from a weight of the others of sleeves 230 facilitates mechanical damping of blades 204 in rotor assembly 214 over a wider combined range of frequencies and/or amplitudes, as compared to rotor assembly 214 having sleeves 230 all of substantially identical weight. Additionally or alternatively, the first and second pluralities of sleeves 230 are arranged in a pattern that facilitates balancing rotor assembly 214 during operation of rotary machine 100. In some such embodiments, the first and second pluralities of sleeves 230 are arranged in a sequential pattern around rotor assembly 214, such as but not limited to "1-2-1-2- . . . " or "1-1-2-2-1-1-2-2- . . . ."

Although such embodiments have been described in terms of a first plurality of sleeves 230 having a first weight and a second plurality of sleeves 230 having a second weight, the disclosure contemplates sleeves 230 in rotor assembly 214 having any suitable number of different weights. For example, in some embodiments, rotor assembly 214 includes first plurality of sleeves 230 having a first weight, second plurality of sleeves 230 having a second weight that is less than the first weight, and a third plurality of sleeves 230 having a third weight that is less than the second weight. In some such embodiments, the first, second, and third pluralities of sleeves 230 are arranged in a sequential pattern that facilitates balancing rotor assembly 214 during operation of rotary machine 100, such as but not limited to "1-2-3-1-2-3- . . . ."

The above-described embodiments include a rotor assembly that includes a plurality of blades and a plurality of sleeves coupled between mid-span nubs of the blades. The non-rigid coupling of the sleeves to the nubs enables rotation of the sleeves with respect to the nubs as the pre-twisted blades untwist due to operation of rotary machine. The embodiments provide advantages over at least some known rotor assemblies having blades configured to couple together at mid-span. Specifically, in some embodiments, the rotor assembly is one of (i) coupled to a rotor configured for operation at about 3600 rpm, and an airfoil length of the blades is greater than 40 inches, and (ii) coupled to a rotor configured for operation at about 3000 rpm, and the airfoil length of the blades is greater than 48 inches, and the sleeves are selected to facilitate damping of non-synchronous vibrations in the blades. For example, in some such embodiments, a mass ratio and/or a density ratio of the sleeves and airfoils is selected to facilitate damping of non-synchronous vibrations in the blades. As such, fatigue of the blade resulting from non-synchronous vibratory stresses during operation is reduced, and an operational life of the blade is correspondingly increased.

Also specifically, in certain embodiments, the blades include integral covers, and a suction side edge of each cover is configured to couple against a pressure side edge of a cover of an adjacent blade, such that the covers cooperate with the sleeves to facilitate damping of non-synchronous vibrations in the blades. For example, in some such embodiments, a contact angle between the blades, such as in a locking complementary z-shaped configuration, is selected to facilitate damping of non-synchronous vibrations in the blades. Again, fatigue of the blade resulting from non-synchronous vibratory stresses during operation is reduced, and an operational life of the blade is correspondingly increased.

Also specifically, in some embodiments, ends of the sleeves include diagonally opposed curved portions which facilitate rotation and retention of the sleeves by the nubs at varying operational speeds of the rotor assembly, and reduce an amount of material required for the sleeve. Also specifically, in certain embodiments, the ends of the sleeve are configured to cooperate with the nubs to orient the sleeve during operation, reducing an aerodynamic loss associated with the presence of the sleeve in a path of the working fluid. Also specifically, in certain embodiments, at least one of the sleeves has a first weight that differs from a second weight of another of the sleeves, facilitating damping of a wider range of vibrations and/or improved balancing of the rotor assembly while maintaining the use of identical blades.

Exemplary embodiments of rotor assemblies are described above in detail. The disclosure is not limited to the specific embodiments described herein, but rather, components of systems may be utilized independently and separately from other components and/or steps described herein. For example, embodiments of the blades, sleeves, and covers of the rotor assemblies may also be used in combination with other rotary machines, and are not limited to practice with only the steam turbine described herein. Rather, the exemplary embodiment can be implemented and utilized in connection with many other rotor assembly applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly coupled to a rotor, said rotor assembly comprising:
    a plurality of blades spaced circumferentially, each of said plurality of blades comprising an airfoil that extends radially between a root end and a tip end, said airfoil comprising a pressure side, a suction side, a pressure side nub extending from said pressure side, and a suction side nub extending from said suction side, wherein an airfoil length defined between said root and tip ends is greater than one of (i) 40 inches, wherein the rotor is configured for operation at about 3600 rpm, and (ii) 48 inches, wherein the rotor is configured for operation at about 3000 rpm; and
    a plurality of sleeves, each of said plurality of sleeves extends from a first end to a second end along a longitudinal axis of said each of said plurality of sleeves, said first end coupled to said pressure side nub of a first of said plurality of blades and said second end coupled to said suction side nub of an adjacent second of said plurality of blades, wherein each of said first end and said second end includes an intermediate end portion orthogonal to said longitudinal axis and a flat end portion and a curved end portion extending oppositely from said intermediate end portion, and wherein said curved end portion of said first end and said curved end portion of said second end are diagonally opposed.

2. The rotor assembly according to claim 1, wherein each of said pressure side nub and said suction side nub comprises a base portion coupled to said airfoil and a distal end extending from said base portion, said distal end having a reduced width relative to said base portion, and wherein when said rotor assembly is not in operation, said curved end portion of said first end of said each of said plurality of sleeves is coupled against said distal end of said pressure side nub and said curved end portion of said second end of said each of said plurality of sleeves is coupled against said distal end of said suction side nub.

3. The rotor assembly according to claim 1, wherein each of said pressure side and suction side nubs comprises:
    a base portion coupled to said airfoil; and
    a distal end extending circumferentially from said base portion, said distal end of each of said pressure side nub and said suction side nub is oriented at a nub angle relative to a plane defined perpendicular to a radial axis of said airfoil.

4. The rotor assembly according to claim 1, wherein each of said plurality of blades further comprises a cover coupled to said tip end, said cover extends circumferentially from a suction side edge to a pressure side edge.

5. The rotor assembly according to claim 4, wherein said suction side edge defines a primary suction side contact surface and said pressure side edge defines a primary pressure side contact surface, said primary suction side contact surface is configured to slidably couple against said primary pressure side contact surface.

6. The rotor assembly according to claim 5, wherein a contact angle defined between each of said contact surfaces and a circumferential direction is within a range of from about 30 degrees to about 65 degrees.

7. The rotor assembly according to claim 5, wherein a ratio of a mass of said plurality of sleeves to a mass of said airfoils is in a range from about 0.01 percent to about 1.0 percent.

8. The rotor assembly according to claim 1, wherein at least one of said plurality of sleeves has a first weight that differs from a second weight of another of said plurality of sleeves.

9. The rotor assembly according to claim 8, wherein a wall thickness of said at least one sleeve is greater than a wall thickness of said other of said plurality of sleeves.

10. The rotor assembly according to claim 8, wherein a density of a material used to form said at least one sleeve is greater than a density of a material used to form said other of said plurality of sleeves.

11. A rotor assembly comprising:
a plurality of blades spaced circumferentially, each of said plurality of blades comprising:
an airfoil that extends radially between a root end and a tip end, said airfoil comprising a pressure side, a suction side, a pressure side nub extending from said pressure side, and a suction side nub extending from said suction side; and
a cover coupled to said tip end, said cover extends circumferentially from a suction side edge to a pressure side edge, said suction side edge of said cover of each of said plurality of blades is configured to couple against said pressure side edge of said cover of an adjacent one of said plurality of blades; and
a plurality of sleeves, each of said plurality of sleeves has a wall thickness and extends from a first end to a second end, said first end coupled to said pressure side nub of a first of said plurality of blades and said second end coupled to said suction side nub of an adjacent second of said plurality of blades, wherein each of said first end and said second end includes a flat end portion and a curved end portion, wherein said curved end portion has a radius greater than said wall thickness, and wherein said curved end portion of said first end and said curved end portion of said second end are diagonally opposed.

12. The rotor assembly according to claim 11, wherein each of said plurality of sleeves extends from said first end to said second end along a longitudinal axis of said each of said plurality of sleeves, wherein each of said first end and said second end includes an intermediate end portion orthogonal to said longitudinal axis, said flat end portion and said curved end portion extending oppositely from said intermediate end portion.

13. The rotor assembly according to claim 11, wherein each of said pressure side and suction side nubs comprises:
a base portion coupled to said airfoil; and
a distal end extending circumferentially from said base portion, said distal end of each of said pressure side nub and said suction side nub is oriented at a nub angle relative to a plane defined perpendicular to a radial axis of said airfoil.

14. The rotor assembly according to claim 11, wherein said rotor assembly is coupled to a rotor, and an airfoil length defined between said root and tip ends is greater than one of (i) 40 inches, wherein the rotor is configured for operation at about 3600 rpm, and (ii) 48 inches, wherein the rotor is configured for operation at about 3000 rpm.

15. The rotor assembly according to claim 11, wherein said suction side edge defines a primary suction side contact surface and said pressure side edge defines a primary pressure side contact surface, said primary suction side contact surface is configured to slidably couple against said primary pressure side contact surface.

16. The rotor assembly according to claim 15, wherein a contact angle defined between each of said contact surfaces and a circumferential direction is within a range of from about 30 degrees to about 65 degrees.

17. The rotor assembly according to claim 15, wherein a ratio of a mass of said plurality of sleeves to a mass of said airfoils is in a range from about 0.01 percent to about 1.0 percent.

18. The rotor assembly according to claim 11, wherein at least one of said plurality of sleeves has a first weight that differs from a second weight of another of said plurality of sleeves.

19. The rotor assembly according to claim 18, wherein a wall thickness of said at least one sleeve is greater than a wall thickness of said other of said plurality of sleeves.

20. The rotor assembly according to claim 18, wherein a density of a material used to form said at least one sleeve is greater than a density of a material used to form said other of said plurality of sleeves.

\* \* \* \* \*